United States Patent
Maaref

(10) Patent No.: US 10,433,358 B2
(45) Date of Patent: *Oct. 1, 2019

(54) SYSTEM AND METHOD FOR ESTABLISHING A D2D COMMUNICATION GROUP

(71) Applicant: Amine Maaref, Ottawa (CA)

(72) Inventor: Amine Maaref, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,671

(22) Filed: Apr. 10, 2018

(65) Prior Publication Data

US 2018/0235020 A1    Aug. 16, 2018

Related U.S. Application Data

(63) Continuation of application No. 15/060,018, filed on Mar. 3, 2016, now Pat. No. 9,967,910.

(51) Int. Cl.
*H04W 76/14* (2018.01)
*H04W 8/00* (2009.01)
(Continued)

(52) U.S. Cl.
CPC .............. *H04W 76/14* (2018.02); *H04W 4/08* (2013.01); *H04W 8/005* (2013.01); *H04W 8/186* (2013.01); *H04W 48/12* (2013.01)

(58) Field of Classification Search
CPC ... H04W 76/023; H04W 92/18; H04W 8/005; H04W 4/005; H04W 72/048;
(Continued)

(56) References Cited

U.S. PATENT DOCUMENTS 9,326,303 B2  4/2016  Ji et al.
9,532,204 B2  12/2016  Nguyen et al.
(Continued)

FOREIGN PATENT DOCUMENTS

CN  104662817 A  5/2015
CN  104838371 A  8/2015
EP  2986051 B1   5/2018

OTHER PUBLICATIONS

Vanganuru, Kiran et. al. "Downlink System Capacity of a Cellular Network with Cooperative Mobile Relay", WWRF25-WG4-05, Jan. 5, 2010, pp. 1-6, King of Prussia, Pennsylvania, USA.

(Continued)

*Primary Examiner* — Liton Miah

(57) ABSTRACT

Systems and methods are disclosed for establishing a device-to-device (D2D) group amongst a plurality of user equipments (UEs). In one embodiment a target UE transmits, using D2D communication, a request message inviting at least one other UE to be part of a D2D group with the target UE. A neighbor UE receives the request message and transmits a report message indicating that the neighbor UE will be part of the D2D group with the target UE. A base station receives the report message and transmits to the target UE and to the neighbor UE a confirmation message indicating that the neighbor UE is in the D2D group with the target UE.

20 Claims, 10 Drawing Sheets

(51) Int. Cl.
*H04W 4/08* (2009.01)
*H04W 8/18* (2009.01)
*H04W 48/12* (2009.01)

(58) Field of Classification Search
CPC ..... H04W 48/10; H04W 76/02; H04W 84/18; H04W 8/186; H04W 4/008; H04W 72/121; H04W 88/02
See application file for complete search history.

(56) References Cited

U.S. PATENT DOCUMENTS

| | | | |
|---|---|---|---|
| 9,661,585 B2 | 5/2017 | Boudreau et al. | |
| 9,801,199 B2 | 10/2017 | Wu et al. | |
| 9,894,467 B2* | 2/2018 | Lee | H04W 4/70 |
| 2011/0028181 A1 | 2/2011 | Byun et al. | |
| 2012/0322484 A1 | 12/2012 | Yu et al. | |
| 2013/0148526 A1* | 6/2013 | Hwang | H04W 4/08 |
| | | | 370/252 |
| 2013/0322388 A1 | 12/2013 | Ahn et al. | |
| 2014/0056220 A1* | 2/2014 | Poitau | H04W 76/14 |
| | | | 370/328 |
| 2014/0169239 A1 | 6/2014 | Maaref et al. | |
| 2015/0117377 A1 | 4/2015 | Maaref et al. | |
| 2015/0230224 A1 | 8/2015 | Maaref et al. | |
| 2015/0264123 A1* | 9/2015 | Smadi | H04W 4/12 |
| | | | 709/206 |
| 2016/0165561 A1* | 6/2016 | Lee | H04W 76/14 |
| | | | 370/350 |
| 2016/0345307 A1 | 11/2016 | Huang et al. | |
| 2017/0006651 A1 | 1/2017 | Jung et al. | |
| 2017/0257898 A1 | 9/2017 | Maaref | |

OTHER PUBLICATIONS

Raghothaman, Balaji, et al. "System Architecture for a Cellular Network with UE Relays for Capacity and Coverage Enhancement", published in 2012 (exact month of publication in the year 2012 is unknown), pp. 1-6, King of Prussia, Pennsylvania, USA.
Choi, Kae Won, et al. "Device-to-Device Discovery for Proximity-Based Service in LTE-Advanced System", IEEE Journal on Selected Areas in Communications, Jan. 2015, pp. 55-66, vol. 33, No. 1.
Raghothaman, Balaji, et al. "System Architecture for a Cellular Network with Cooperative Mobile Relay", IEEE, 2011, pp. 1-5, King of Prussia, Pennsylvania, USA.
Doppler, Klaus, et al. "Advances in D2D Communications: Energy efficient Service and Device Discovery Radio", IEEE, 2011, pp. 1-6, Finland.
Samsung, "Discussion on D2D Group Communication", 3GPP TSG RAN WG1 Meeting #74, Aug. 23, 2013, R1-133117, pp. 1-5.
XP05073693 R2-134215 ZTE Corporation,"Considerations on D2D group communication procedure",3GPP TSG-RAN WG2 Meeting #84,San Francisco, USA, Nov. 11-15, 2013.total 6 pages.

* cited by examiner

SYSTEM AND METHOD FOR ESTABLISHING A D2D COMMUNICATION GROUP

RELATED APPLICATION

This is a continuation of U.S. patent application Ser. No. 15/060,018, which was filed on Mar. 3, 2016, which is entitled "System and Method for Establishing a D2D Communication Group", and which is incorporated herein by reference.

FIELD

The present application relates to establishing a device-to-device communication group amongst user equipment.

BACKGROUND

In a traditional mobile network, all messages between two user equipments (UEs) pass through a base station, even if the two UEs communicating with each other are in close physical proximity.

Device-to-device (D2D) communication has more recently been introduced to allow for UEs in close proximity to directly communicate with each other without using the base station.

As the number of UEs in a mobile network increases, there may be more potential opportunities for D2D communication.

SUMMARY

Systems and methods are disclosed for establishing a D2D group amongst a plurality of UEs.

In one embodiment, there is provided a method that may include a target UE transmitting, using D2D communication, a request message inviting at least one other UE to be part of a D2D group with the target UE. A neighbour UE may receive the request message and transmit a report message indicating that the neighbour UE will be part of the D2D group with the target UE. A base station of a network may receive the report message and transmit to the target UE and to the neighbour UE a confirmation message indicating that the neighbour UE is in the D2D group with the target UE. After receiving the confirmation message, the neighbour UE may communicate with the target UE, using D2D communication, to assist with wireless communication between the target UE and the base station.

In another embodiment, there is provided a system that may include a target UE configured to transmit, using D2D communication, a request message inviting at least one other UE to be part of a D2D group with the target UE. The system may further include neighbour UE configured to receive the request message and transmit a report message indicating that the neighbour UE will be part of the D2D group with the target UE. The system may further include a base station of a network configured to receive the report message and transmit to the target UE and to the neighbour UE a confirmation message indicating that the neighbour UE is in the D2D group with the target UE. The neighbour UE may be further configured to: after receiving the confirmation message, communicate with the target UE, using D2D communication, to assist with wireless communication between the target UE and the base station.

In another embodiment, there is provided a method performed by a UE that may include transmitting, using D2D communication, a request message inviting at least one other UE to be part of a D2D group with the UE. The method may further include receiving a confirmation message from a base station indicating that a neighbour UE is in the D2D group with the UE. The confirmation message may be in response to a report message to the base station indicating that the neighbour UE will be part of the D2D group with the UE.

In another embodiment, there is provided a UE that may include at least one antenna. The UE may further include a D2D communication module configured to instruct the UE to: transmit, using D2D communication, a request message inviting at least one other UE to be part of a D2D group with the UE; and/or receive a confirmation message from a base station indicating that a neighbour UE is in the D2D group with the UE. The confirmation message may be in response to a report message to the base station indicating that the neighbour UE will be part of the D2D group with the UE.

In another embodiment, there is provided a method performed by a UE that may include receiving, using D2D communication, a request message inviting at least one UE to be part of a D2D group with a target UE. The method may further include transmitting a report message to a base station indicating that the UE will be part of the D2D group with the target UE. The method may further include receiving a confirmation message from the base station indicating that the UE is in the D2D group with the target UE.

In another embodiment, there is provided a UE that may include at least one antenna. The UE may further include a D2D communication module configured to instruct the UE to: receive, using D2D communication, a request message inviting at least one UE to be part of a D2D group with a target UE; and/or transmit a report message to a base station indicating that the UE will be part of the D2D group with the target UE; and/or receive a confirmation message from the base station indicating that the UE is in the D2D group with the target UE.

In another embodiment, there is provided a method performed by a base station of a network. The method may include receiving a report message from a neighbour UE indicating that the neighbour UE will be part of a D2D group with a target UE upon the neighbour UE receiving a request message inviting at least one UE to be part of a D2D group with the target UE. The method may further include transmitting to the target UE and to the neighbour UE a confirmation message indicating that the neighbour UE is in the D2D group with the target UE.

In another embodiment, there is provided a system in a network. The system may include a base station. The system may further include a D2D communication module configured to instruct the base station to: receive a report message from a neighbour UE indicating that the neighbour UE will be part of a D2D group with a target UE upon the neighbour UE receiving a request message inviting at least one UE to be part of a D2D group with the target UE; and/or transmit to the target UE and to the neighbour UE a confirmation message indicating that the neighbour UE is in the D2D group with the target UE.

Other aspects and features will become apparent to those of ordinary skill in the art upon review of the following description.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
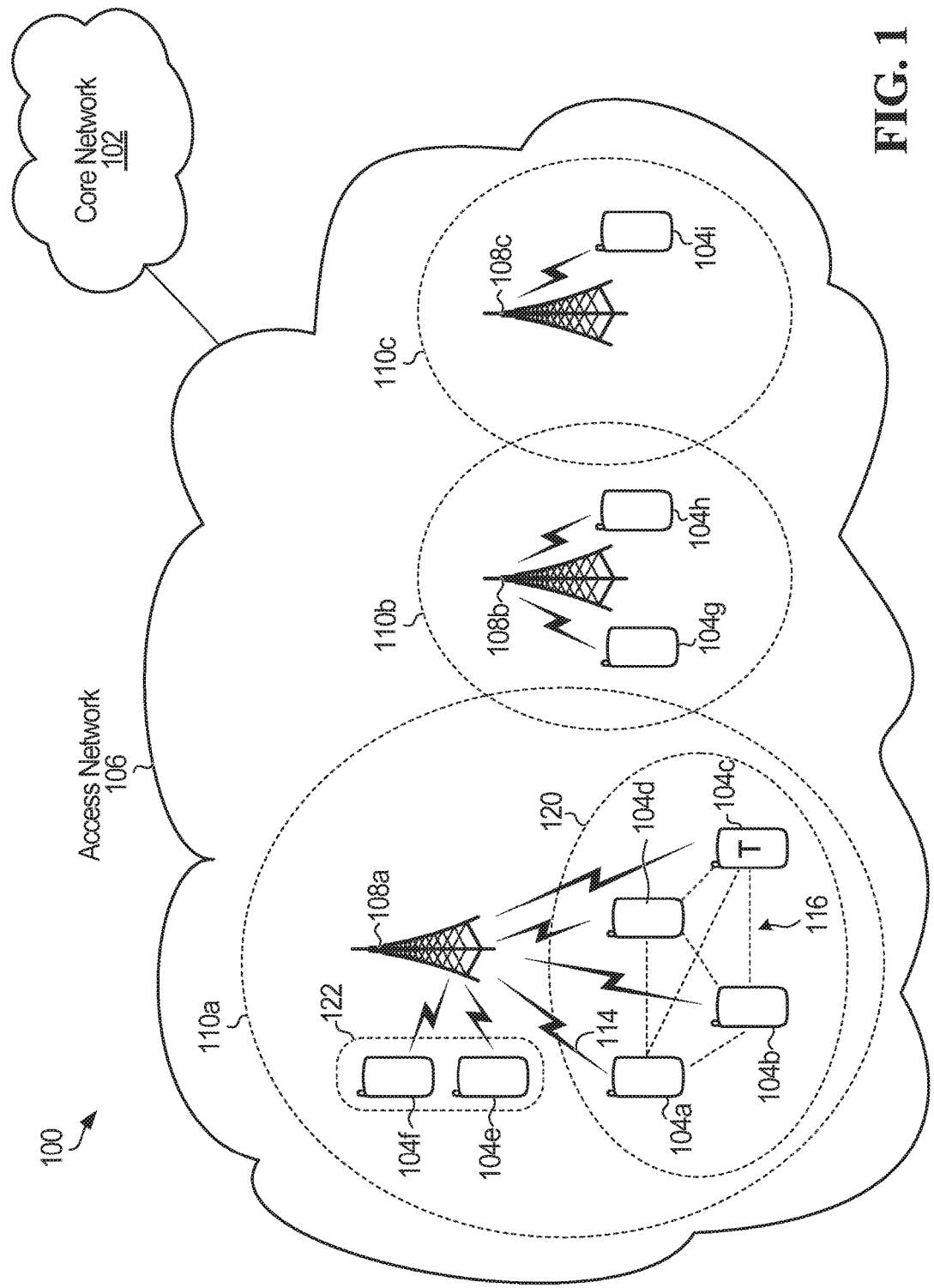
FIG. 1 is a block diagram of a telecommunications network according to one embodiment.

FIG. 1 is a block diagram of a telecommunications network 100 according to one embodiment. The telecommunications network 100 includes a core network 102 and an access network 106. The access network 106 serves a plurality of UEs 104a, 104b, 104c, 104d, 104e, 104f, 104g, 104h, and 104i. The access network 106 may be an Evolved Universal Terrestrial Access (E-UTRA) network. As another example, the access network 106 may be a cloud access network (C-RAN). The access network 106 includes a plurality of base stations 108a, 108b, and 108c. The base stations 108a-c each provide a respective wireless coverage area 110a, 110b, and 110c. Each of the base stations 108a-c may be implemented using a radio transceiver, one or more antennas, and associated processing circuitry, such as antenna radio frequency (RF) circuitry, analog-to-digital/digital-to-analog converters, etc.

Although not illustrated, the base stations 108a-c are each connected to the core network 102, either directly or through one or more central processing hubs, such as servers. The base stations 108a-c may serve as the gateway between the wireline and wireless portion of the access network 106.

Each one of base stations 108a-c may instead be referred to as a base transceiver station, a radio base station, a network node, a transmit node, a transmit point, a Node B, an eNode B. or a remote radio head (RRH), depending upon the implementation.

In operation, the plurality of UEs 104a-i access the telecommunications network 100 using the access network 106 by wirelessly communicating with one or more of the base stations 108a-c.

UEs 104a-d are in close proximity to each other. Although the UEs 104a-d can each wirelessly communicate with the base station 108a, they can also directly communicate with each other using D2D communications 116. A D2D communication is a direct communication between UEs that does not go through an access network component, such as a base station. Instead, a D2D communication goes through a D2D communication interface. As shown in FIG. 1, D2D communications 116 are directly between the UEs 104a-d and are not routed through the base station 108a, or any other part of the access network 106. D2D communications 116 may also be referred to as lateral communications. D2D communications use a sidelink channel and a sidelink D2D air interface. On the other hand, a communication between an access network component, such as base station 108a, and a UE, as in communication 114, is called an access communication. An access communication occurs over an access channel, which can be an uplink or downlink channel, and an access communication uses a radio access communication interface, such as a cellular radio access air interface. Access and D2D air interfaces may use different transmission formats, such as different waveforms, different multiple access schemes, and/or different radio access technologies. Some examples of radio access technologies that may be used by an access air interface and/or a D2D air interface are: Long Term Evolution (LTE). LTE License Assisted Access (LTE-LAA), and WiFi.

By using the D2D communications 116, the UEs 104a-d may be able to assist with wireless communications between the UEs 104a-d and the base station 108a. As one example, if UE 104c fails to correctly decode a packet received from the base station 108a, but if UE 104d is able to receive and correctly decode the packet from the base station 108a, then UE 104d could directly transmit the decoded packet to UE 104c using D2D communications 116. As another example, if UE 104c moves out of wireless coverage area 110c, such that UE 104c can no longer wirelessly communicate with the base station 108a, then UE 104b may forward messages between the UE 104c and the base station 108a. As another example, UE 104a and UE 104c may both receive a signal transmitted from the base station 108a that carries a packet meant for UE 104c. UE 104a may then transmit to UE 104c, via D2D communications 116, the signal as received by UE 104a. UE 104c may then use the information received from UE 104a to help decode the packet from the base station 108a. In these examples, capacity and/or coverage may be enhanced through the assistance of UEs 104a. 104b, and/or 104d.

The UEs 104a-d form a D2D group 120. The access network 106 may assign a D2D group identifier (ID) to the D2D group 120. The D2D group ID may allow the access network 106 to address the D2D group 120 as a whole and distinguish the D2D group 120 from other D2D groups. The D2D group ID may also be used to broadcast information within the D2D group, i.e. address all other UEs within the D2D group 120. The D2D group 120 may form a logical or virtual device mesh in which the members of the D2D group 120 communicate amongst themselves using D2D communications over a D2D air interface, but the D2D group 120 as a whole acts as a single distributed virtual transceiver with respect to the access network 106. The D2D group ID may be a group radio network temporary identifier (G-RNTI).

When a particular UE in the D2D group 120 is being assisted or is to be assisted with wireless communication between that UE and the base station 108a, then that particular UE is referred to as the target UE. In the examples above. UE 104c is being assisted and so is the target UE 104c. Therefore, target UE 104c is labelled with a 'T' in FIG. 1. The other UEs 104a. 104b, and 104d in the D2D group 120 form a cooperation candidate set, which is a set of UEs that may cooperate to help the target UE 104c. The subset of UEs in the cooperation candidate set that actually assist the target UE 104c form a cooperation active set. The cooperation active set may be dynamically selected to assist the target UE 104c. The UEs in the cooperation active set are referred to as cooperating UEs (CUEs). In D2D group 120, UEs 104a, 104b, and 104d form the cooperation candidate set. If UEs 104a and 104b actually assist target UE 104c, then UEs 104a and 104b form the cooperation active set and are the CUEs. As UEs 104a-d move around, some may leave the D2D group 120 and/or other UEs may join the D2D group 120. Therefore, the cooperation candidate set may change over time, e.g., the cooperation candidate set may change semi-statically. The D2D group 120 may also be terminated by the network 106, e.g., if the network 106 determines that there is no longer a need or opportunity for the D2D group 120 to provide assistance in wireless communication between the base station 108a and members of the D2D group 120.

There may be more than one D2D group. For example, UEs 104e and 104f in FIG. 1 form another D2D group 122.

For a D2D group to exist, the D2D group must first be established. D2D group establishment is discussed below.

Figure 2:
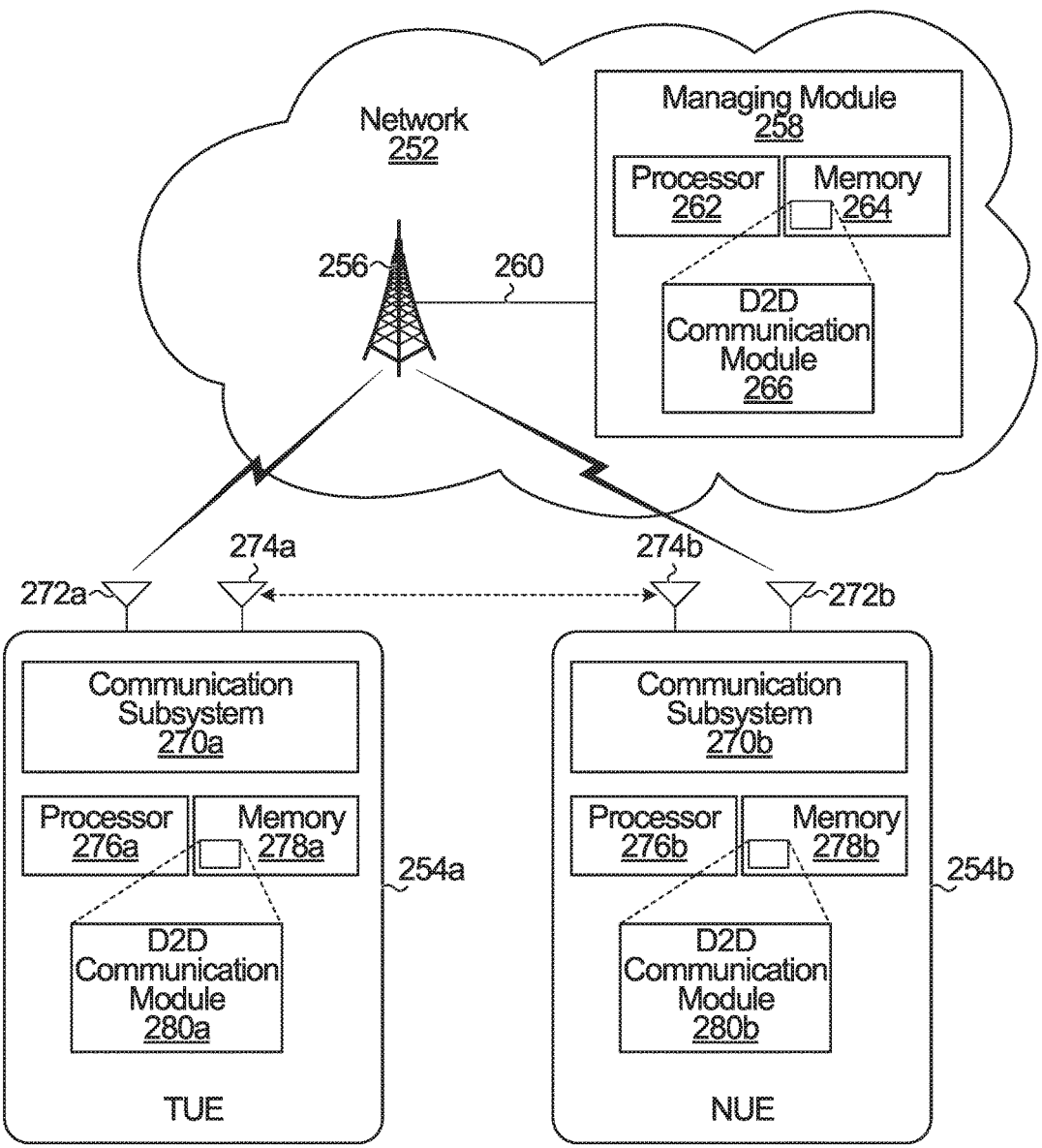
FIG. 2 is a block diagram of a network serving two UEs according to one embodiment.

FIG. 2 is a block diagram of a network 252 serving two UEs 254a and 254b, according to one embodiment. The network 252 may be the access network 106 from FIG. 1, and the two UEs 254a and 254b may be two of the four UEs 104a-d in FIG. 1, or the UEs 254a and 254b may be UEs 104e and 104f in FIG. 1. However, more generally this need not be the case, which is why different reference numerals are used in FIG. 2.

The network 252 includes a base station 256 and a managing module 258. The managing module 258 instructs the base station 256 to perform actions. The managing module 258 is illustrated as physically separate from the base station 256 and coupled to the base station 256 via a communication link 260. For example, the managing module 258 may be part of a server in the network 252. Alternatively, the managing module 258 may be part of the base station 256.

The managing module 258 includes a processor 262, a memory 264, and a D2D communication module 266. The D2D communication module 266 is implemented by the processor 262 when the processor 262 accesses and executes a series of instructions stored in the memory 264, the instructions defining the actions of the D2D communication module 266. When the instructions are executed, the D2D communication module 266 causes the base station 256 to perform the actions described herein so that the network 252 can establish, coordinate, instruct, and/or control a D2D group. Alternatively, the D2D communication module 266 may be implemented using dedicated integrated circuitry, such as an application specific integrated circuit (ASIC) or a programmed field programmable gate array (FPGA).

The UE 254a includes a communication subsystem 270a, two antennas 272a and 274a, a processor 276a, and a memory 278a. The UE 254a also includes a D2D communication module 280a. The D2D communication module 280a is implemented by the processor 276a when the processor 276a accesses and executes a series of instructions stored in the memory 278a, the instructions defining the actions of the D2D communication module 280a. When the instructions are executed, the D2D communication module 280a causes the UE 254a to perform the actions described herein in relation to establishing and participating in a D2D group. Alternatively, the D2D module 280a may be implemented by dedicated integrated circuitry, such as an ASIC or an FPGA.

The communication subsystem 270a includes processing and transmit/receive circuitry for sending messages from and receiving messages at the UE 254a. Although one communication subsystem 270a is illustrated, the communication subsystem 270a may be multiple communication subsystems. Antenna 272a transmits wireless communication signals to, and receives wireless communications signals from, the base station 256. Antenna 274a transmits D2D communication signals to, and receives D2D communication signals from, other UEs, including UE 254b. In some implementations there may not be two separate antennas 272a and 274a. A single antenna may be used. Alternatively, there may be several antennas, but not separated into antennas dedicated only to D2D communication and antennas dedicated only to communicating with the base station 256.

D2D communications may be over Wi-Fi, in which case the antenna 274a may be a Wi-Fi antenna. Alternatively, the D2D communications may be over Bluetooth™, in which case the antenna 274a may be a Bluetooth™ antenna. The D2D communications may utilize uplink and/or downlink resources, such as time slots and/or frequencies, which may be scheduled by the network 252. The D2D communications may be over licensed or unlicensed spectrum.

The UE 254b includes the same components described above with respect to the UE 254a. That is, UE 254b includes communication subsystem 270b, antennas 272b and 274b, processor 276b, memory 278b, and D2D communication module 280b.

The UE 254a is designated as a target UE (TUE) and will therefore be called TUE 254a. The UE 254b is a neighbouring UE (NUE) and will therefore be called NUE 254b. The NUE 254b may be able to assist with wireless communications between the base station 256 and TUE 254a if a D2D group were to be established that included TUE 254a and NUE 254b.

UE 254a may be specifically chosen as the target UE by the network 252. Alternatively, the UE 254a may itself determine that it wants to be a target UE and inform the network 252 by sending a message to the base station 256. Example reasons why UE 254a may choose or be selected by the network 252 to be a target UE include: low wireless channel quality between the UE 254a and the base station 256, many packets to be communicated between the base station 256 and the UE 254a, and/or the presence of a neighbour UE that is a good candidate for helping with communications between the base station 256 and the UE 254a.

UE 254a need not always stay a target UE. For example, UE 254a may lose its status as a target UE once there is no longer a need or desire for assistance with wireless communications between UE 254a and the base station 256. UE 254a may assist another target UE that is a neighbour at a later time. In general, a particular UE may sometimes be a target UE and other times may be a neighbour UE assisting another target UE. Also, sometimes a particular UE may be both a target UE receiving assistance from one or more neighbour UEs and also a neighbour UE itself assisting another target UE. In the examples below, the UE 254a acts only as a target UE, i.e, TUE 254a, and the UE 254b is a neighbour UE to the TUE 254a, i.e., NUE 254b.

Figure 3:
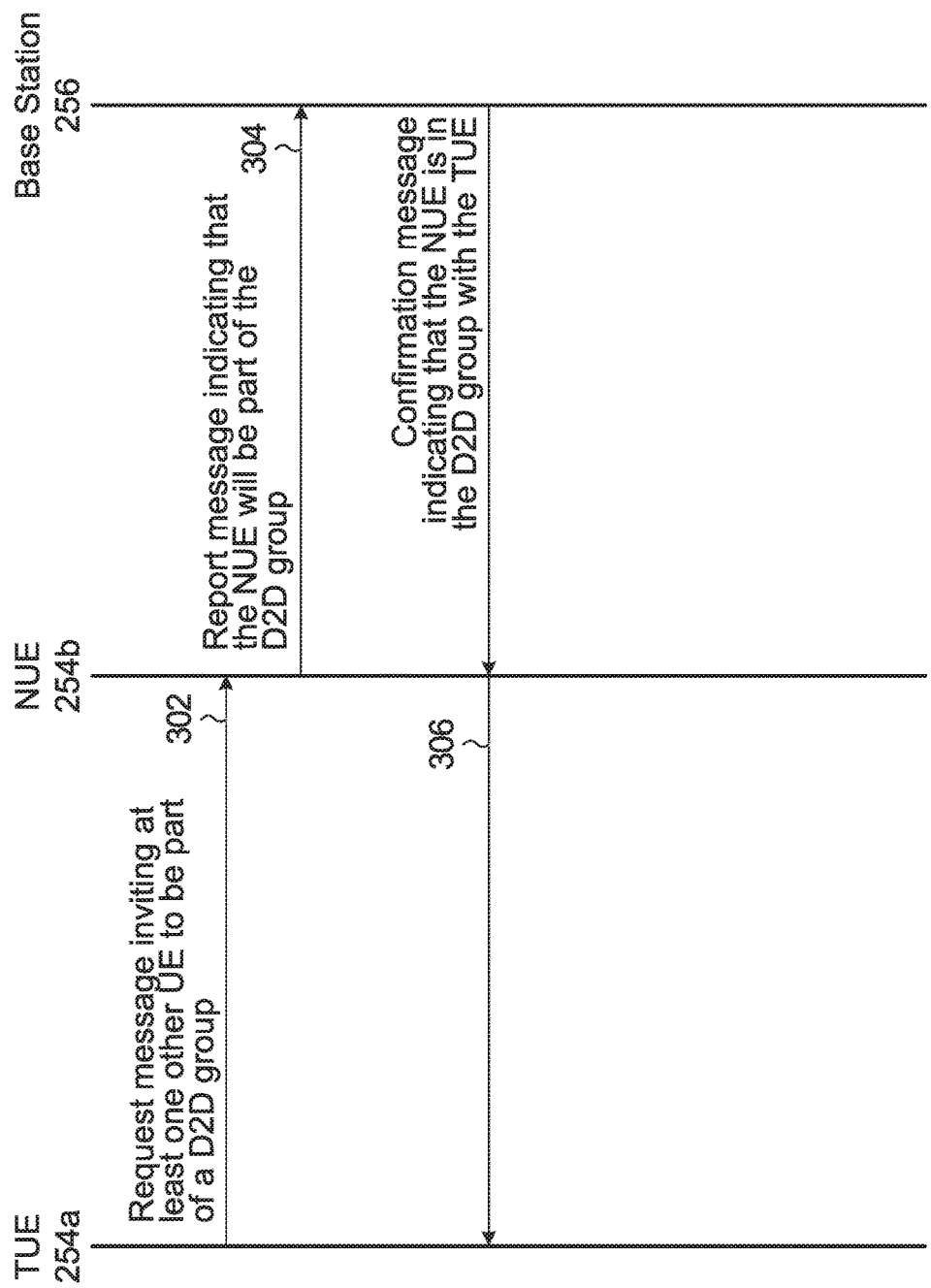
FIG. 3 is a flowchart of operations performed by a base station, target UE, and neighbour UE according to one embodiment.

FIG. 3 is a flowchart of operations performed by the base station 256, TUE 254a, and NUE 254b according to one embodiment.

In step 302, the TUE 254a transmits, using D2D communication, a request message inviting at least one other UE to be part of a D2D group with the TUE 254a. In some embodiments, the network 252 controls if and/or when step 302 is to happen. For example, prior to step 302 the network 252 may transmit a message to the TUE 254a indicating that the TUE 254a is to perform step 302. The message may help the network 252 to understand or track which group it is when a D2D group is established. In some embodiments, the request message transmitted in step 302 is sent on a physical sidelink discovery channel (PSDCH). In some embodiments, the request message transmitted in step 302 includes a preamble. The preamble may or may not be assigned by the network 252. If the preamble is assigned by the network 252, then the network 252 may transmit a message to the TUE 254a providing an indication of which preamble is assigned. The indication may be the preamble itself. The preamble may be a D2D random access preamble. The D2D random access preamble may be a contention-based D2D random access preamble, or the D2D random access preamble may be a contention-free D2D random access preamble assigned by the network 252. For example, prior to step 302, the base station 256 may transmit to the TUE 254a a contention-free D2D random access preamble that is to be used or, if the TUE 254a already has or knows how to generate D2D random access preambles, then the base station 256 may transmit to the TUE 254a an indication of which D2D random access preamble to use. The base station 256 may provide the D2D random access preamble, or the indication of the D2D random access preamble, in a radio resource control (RRC) signalling message. The RRC signalling message may be sent on a downlink shared channel (DL-SCH). In some embodiments, the D2D random access preamble is a contention-free random access preamble that is based on a Zadoff-Chu (ZC) sequence. For example, contention-free D2D random access preambles may be generated from cyclic shifts of a root ZC sequence with a D2D specific root and length to ensure a particular ZC sequence has zero cross-correlation with other ZC sequences generated from cyclic shifts of the same root ZC sequence. In some embodiments, the D2D random access preamble includes a cyclic prefix to assist in lower complexity frequency-domain processing of the D2D random access preamble at the NUE 254b.

In some embodiments, a guard period is provided in the request message in addition to the D2D random access preamble. For example, the guard period may be added to the end of the D2D random access preamble. The guard period may assist in handling timing uncertainty at the NUE 254b. For example, the NUE 254b may not know the timing of when the request message in step 302 will be received, and/or when other request messages from other TUEs may be received, and the guard time may assist in handling interference due to partially overlapping requests messages from different TUEs. UEs such as TUE 254a and NUE 254b may not be fully synchronized for D2D communications, in which case the guard period may accommodate D2D communication timing uncertainty. The D2D communication timing uncertainty may be proportional to the distance between UEs. Using a guard period can result in a D2D random access preamble length being less than a subframe duration, which may allow D2D random access preambles sent by UEs to not interfere with subsequent subframes that may or may not be used for D2D communication.

In some embodiments, the request message sent from the TUE 254a in step 302 is meant for and specifically identifies NUE 254b. However, in the methods below the request message sent in step 302 does not identify any UE in particular, but invites any UE that receives the request message to be part of a D2D group with the TUE 254a.

The NUE 254b receives the request message sent by the TUE 254a in step 302, and the NUE 254b decides that it will be part of a D2D group with the TUE 254a. Therefore, in step 304, the NUE 254b transmits a report message to the base station 256 indicating that the NUE 254b will be part of the D2D group with the TUE 254a. In some embodiments, the NUE 254b may not always decide to be part of the D2D group with the TUE 254a, in which case the report message is not sent to the base station 256. For example, the NUE 254b may decide not to join the D2D group with the TUE 254a if the NUE 254b does not have a high enough quality D2D communication link with the TUE 254a and/or if the NUE 254b does not have a high enough quality communication link with the base station 256 and/or if the NUE 254b does not have adequate battery power. In other embodiments, the NUE 254b may always decide to be part of the D2D group with the TUE 254a, e.g. if the NUE 254b is a "dummy" UE employed by the network operator for the purposes of assisting TUEs in the vicinity of the NUE 254b.

In some embodiments, the report message sent in step 304 is sent on an uplink shared channel (UL-SCH) using an uplink resource granted by the network 252. In this case, the NUE 254b may need to first request and receive the uplink resource grant from the network 252. For example, the NUE 254b may transmit a message to the base station 256 requesting an uplink resource, and the NUE 254b may receive a response message from the base station 256 indicating the uplink resource granted. In other embodiments, the report message sent in step 304 is sent in a grant-free manner using dedicated grant-free radio resources pre-assigned by the network 252.

In some embodiments, the report message sent in step 304 includes an indication, such as an index, of the preamble included in the request message from the TUE 254a. The indication of the preamble may be used to inform the network 252 that the NUE 254b is to be part of a D2D group specifically with TUE 254a, rather than with another TUE that was assigned another preamble. In some embodiments, the report message includes an identifier of the TUE 254a and/or an identifier of the NUE 254b. The identifier of the NUE 254b may be a temporary cell radio network temporary identifier (TC-RNTI) or a cell radio network temporary identifier (C-RNTI) or a core network identifier. Similarly, the identifier of the TUE 254a may be a TC-RNTI, a C-RNTI, or a core network identifier. The NUE 254b may know the identity of the TUE 254a from the request message sent by the TUE 254a.

The base station 256 receives the report message sent in step 304, and in step 306 the base station 256 transmits to the TUE 254a and to the NUE 254b a confirmation message indicating that the NUE 254b is in the D2D group with the TUE 254a. In some embodiments, the confirmation messages includes a D2D group ID assigned by the network 252 to the D2D group. The D2D group ID may allow the network 252 to address the D2D group as a whole and distinguish the D2D group from other D2D groups.

In some embodiments, the confirmation message sent in step 304 includes the indication of the D2D random access preamble sent by the TUE 254a in the request message. In some embodiments, the confirmation message includes an identifier of the TUE 254a and/or an identifier of the NUE 254b. Including the identifiers may ensure that the TUE 254a and the NUE 254b have each other's identities. As above, the identifiers may be a TC-RNTI, a C-RNTI, or a core network identifier. In some embodiments, the confirmation message is sent on a DL-SCH. In some embodiments, the confirmation message is decoded using a D2D random access radio network temporary identifier (D2D-RA-RNTI). In some embodiments, the confirmation message includes a timing correction value used to synchronize a D2D communication between the TUE 254*a* and the NUE 254*b*. The timing correction value may have been computed by the NUE 254*b* upon receiving the request message from the TUE 254*a* and then sent to the network 252 via the report message in step 304.

In some embodiments, the transmission from the base station 256 in step 306 includes other confirmation messages for other UE devices. For example, the base station 256 may transmit a signal including both the confirmation message of step 306 and another confirmation message (not shown) for two other UEs (not shown) confirming that the two other UEs form a different D2D group. If another UE (not shown) also received the request message from the TUE 254*a* in step 302 and transmitted a report message to the base station 256, then the base station 256 may transmit a signal including both the confirmation message of step 306 and another confirmation message (not shown) for the TUE 254*a* and the other UE confirming that the other UE is also part of the D2D group with the TUE 254*a*. A specific example is provided later in relation to FIG. 12.

In some embodiments, after receiving the confirmation message of step 306, the TUE 254*a* and the NUE 254*b* send an acknowledgement to the base station 256.

In some embodiments, the network 252 broadcasts signalling indicating when the request message in step 302 is to be sent and/or when UEs are to listen for a request message and/or what resources, e.g. time-frequency resources, are to be used to send/receive the request message. For example, in LTE, physical random access channel (PRACH) time-frequency resource information may be broadcast to the UEs via the DL-SCH as part of the System Information Block ("SIB 2"). The SIB 2 may be indicated in a physical downlink control channel (PDCCH) using a system information radio network temporary identifier (SI-RNTI). The SIB 2 PRACH configuration includes information such as the random access parameters "PRACH Config index" and "PRACH Frequency Offset", from which a UE may deduce the PRACH resource information along with other uplink parameters. A similar mechanism may be used to signal the D2D PRACH resources for different frequency bands.

In some embodiments, the network 252 may control the amount of power used by the TUE 254*a* to send the request message in step 302. The amount of power may be increased or decreased by the network 252 depending on the number of NUEs that send reporting messages to the network 252. By controlling the amount of power used by the TUE 254*a* to send the request message, interference generated by transmitting the request message may be controlled, and the power may only be increased when needed. In some embodiments, the TUE 254*a* may itself control its own transmission power when sending the request message in step 302. One way in which the power control may be implemented is as follows: a request message is first sent with a predetermined minimum power level. If not enough NUEs respond. i.e. none or not enough confirmation messages are received by the TUE 254*a*, then the TUE 254*a* may send the request message again at a higher power level. This process may be repeated using a higher power level each time a request message is sent until a minimum number of NUEs have joined the D2D group with the TUE 254*a*.

Once the method of FIG. 3 is complete, the TUE 254*a* and the NUE 254*b* are part of a D2D group and may communicate with each other directly using D2D communications. For example, the NUE 254*b* may communicate with the TUE 254*a*, using D2D communication, to assist with wireless communication between the TUE 254*a* and the base station 108*a*. The TUE 254*a* may communicate with the NUE 254*b*, using D2D communication, to be assisted with wireless communication between the TUE 254*a* and the base station 108*a*. The base station 108*a* may wirelessly communicate with the NUE 254*b* to assist in wireless communication between the base station 108*a* and the TUE 254*a*. The base station 108*a* may wirelessly communicate with the NUE 254*b* to be assisted with wireless communication between the base station 108*a* and the TUE 254*a*. The base station 108*a* may transmit a message to the NUE 254*b* instructing the NUE 254*b* to assist with wireless communication between the TUE 254*a* and the base station 108*a*.

In some embodiments, multiband communication occurs during D2D group establishment and operation. Multiband communication is when a UE communicates over more than one radio frequency band. For example, TUE 254*a* may directly communicate with NUE 254*b* using D2D communications via a first frequency band, and TUE 254*a* may directly communicate with another NUE (not shown) using D2D communications via a second frequency band. Multiband operation is discussed in detail in the examples explained later in relation to FIG. 11.

In some embodiments, the TUE 254*a*, NUE 254*b* and network 252 operate according to a radio resource control (RRC) protocol, such as a RRC protocol similar to that deployed as part of the 3GPP LTE-A air interface. In such RRC protocol, a UE may be in one of two modes: RRC_Connected or RRC_Idle, depending upon whether the UE is connected to the network 252. A new third mode may now be defined: "RRC_Cooperating" mode, which is a mode independent of RRC_Connected and RRC_Idle. When a UE is in RRC_Cooperating mode, it means that the UE is in a D2D cooperating mode, that is, the UE is configured to use D2D communications to directly communicate with one or more other UEs. e.g., to assist or be assisted with wireless communication between the UEs and a base station. At the start of the method in FIG. 3, the TUE 254*a* will typically be in RRC_Connected mode, and the NUE 254*b* may be in either RRC_Connected mode or RRC_Idle mode. By the end of the method in FIG. 3, both the TUE 254*a* and the NUE 254*b* may be designated by the network 252 as being in RRC_Cooperating mode. Even if the TUE 254*a* and/or the NUE 254*b* subsequently move between RRC_Connected mode and RRC_Idle mode, the TUE 254*a* and the NUE 254*b* will still always remain in RRC_Cooperating mode as long as the TUE 254*a* and the NUE 254*b* are cooperating in a D2D group. The network 252 may track which mode the TUE 254*a* and the NUE 254*b* are in during operation, including designating the TUE 254*a* and the NUE 254*b* as being in RRC_Cooperating mode as part of, or at the end of, step 306. When the NUE 254*b* is in RRC_Cooperating mode, it may be referred to as a CUE if it is assisting or to assist the TUE 254*a*.

At some point in time in the future after the method of FIG. 3 is complete, the NUE 254*b* and/or the TUE 254*a* will transition out of RRC_Cooperating mode. For example, the NUE 254*b* and/or the TUE 254*a* may themselves decide to transition out of RRC_Cooperating mode due to a change in their circumstance that no longer makes them a good candidate for D2D communication, e.g., low battery power, a low quality or broken D2D communication link, etc. The network 252 may also instruct NUE 254b and/or TUE 254a to transition out of RRC_Cooperating mode, e.g., if the network 252 decides to terminate or modify the D2D group. When a particular UE transitions out of RRC_Cooperating mode, it may still be in RRC_Connected or RRC_Idle mode.

Figure 4:
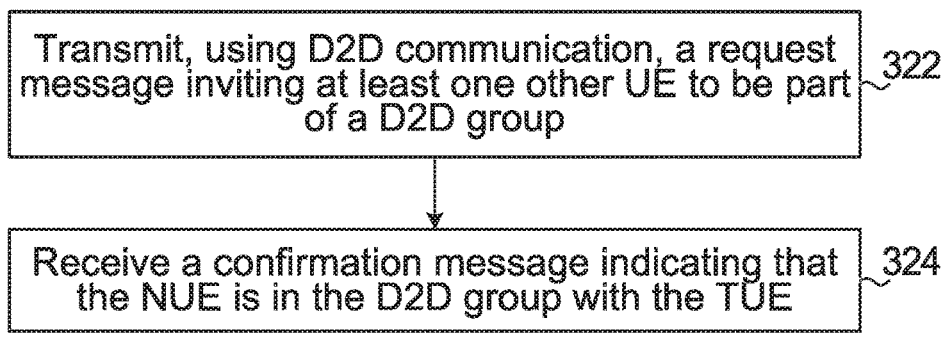
FIG. 4 is a flowchart of operations corresponding to FIG. 3, but from the perspective of the target UE.

FIG. 4 is a flowchart of operations corresponding to FIG. 3, but from the perspective of the TUE 254a. In step 322, the TUE 254a transmits, using D2D communication, the request message inviting at least one other UE to be part of a D2D group with the TUE 254a. In step 324, the TUE 254a receives the confirmation message indicating that the NUE 254b is in the D2D group with the TUE 254a.

Figure 5:
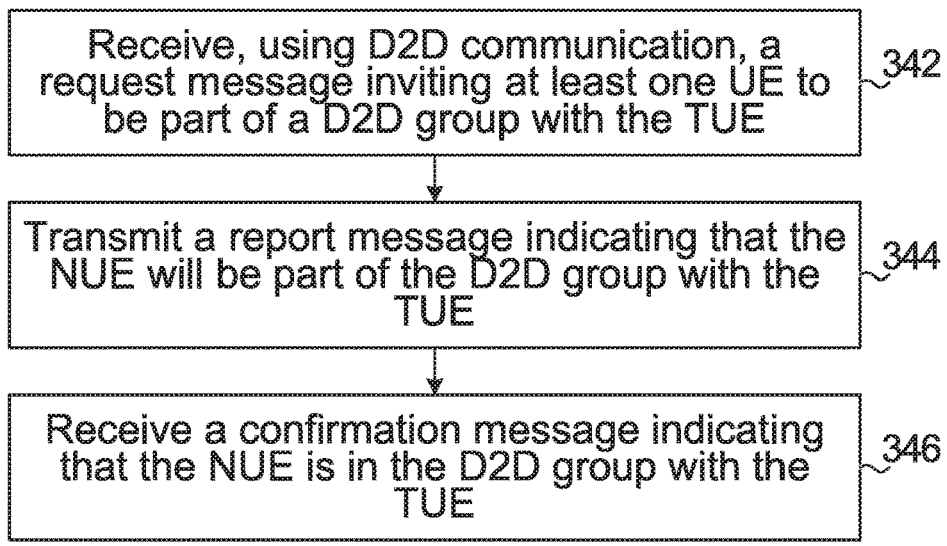
FIG. 5 is a flowchart of operations corresponding to FIG. 3, but from the perspective of the neighbour UE.

FIG. 5 is a flowchart of operations corresponding to FIG. 3, but from the perspective of the NUE 254b. In step 342, the NUE 254b receives, using D2D communication, the request message inviting at least one UE to be part of a D2D group with the TUE 254a. In step 344, the NUE 254b transmits the report message indicating that the NUE 254b will be part of the D2D group with the TUE 254a. In step 346, the NUE 254b receives the confirmation message indicating that the NUE 254b is in the D2D group with the TUE 254a.

Figure 6:
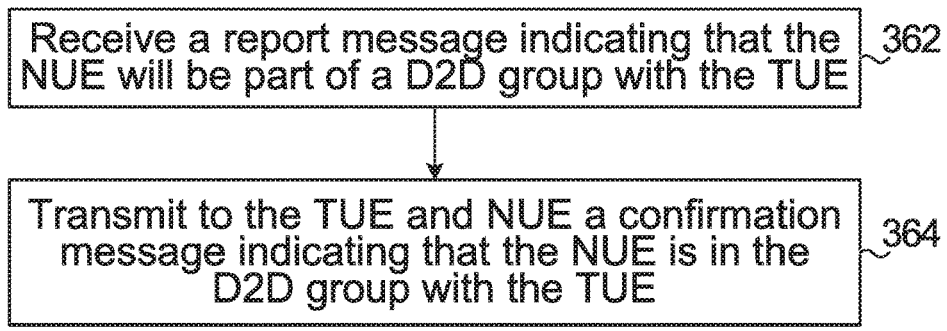
FIG. 6 is a flowchart of operations corresponding to FIG. 3, but from the perspective of the base station.

FIG. 6 is a flowchart of operations corresponding to FIG. 3, but from the perspective of the base station 256. In step 362, the base station receives the report message indicating that the NUE 254b will be part of a D2D group with the TUE 254a. In step 364, the base station 256 transmits to the TUE 254a and to the NUE 254b the confirmation message indicating that the NUE 254b is in the D2D group with the TUE 254a.

The variations and possible configurations of the request, report, and confirmation messages that were described above in relation to FIG. 3 also apply to FIGS. 4 to 6.

A more specific example will now be described in relation to FIGS. 7 to 10. The example described in relation to FIGS. 7 to 10 implements a protocol reminiscent of the random access procedure used in LTE, but different in that the protocol described in relation to FIGS. 7 to 10 is adapted for the alternative purpose of network-assisted UE discovery and establishment of a D2D communication group. In addition to RRC_Connected mode and RRC_Idle mode, a new RRC_Cooperating mode is provided.

Figure 7:
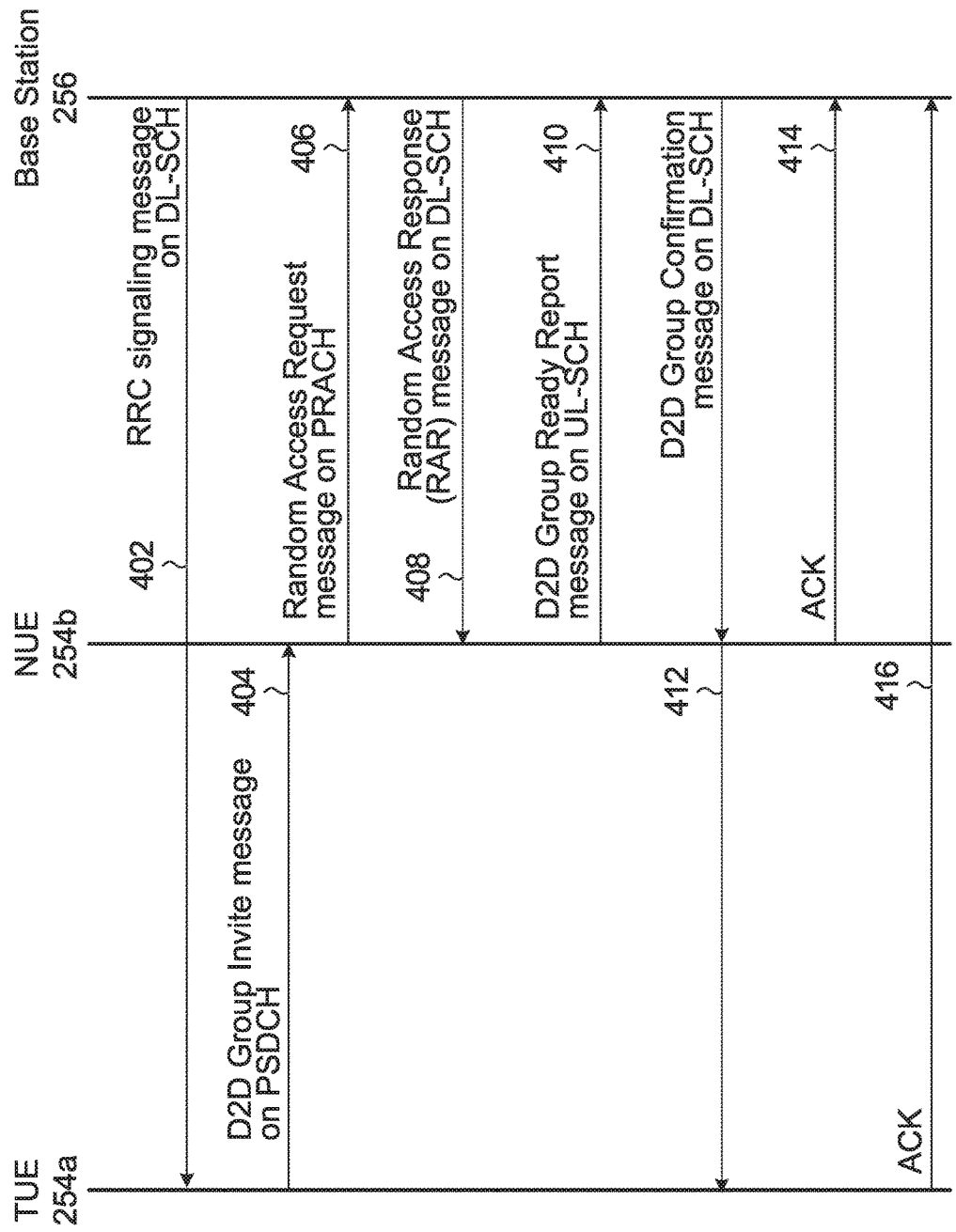
FIG. 7 is a flowchart of operations performed by a base station, target UE, and neighbour UE according to another embodiment.

FIG. 7 is a flowchart of operations performed by the base station 256, the TUE 254a and the NUE 254b, according to one embodiment. In this example, the TUE 254a is in RRC_Connected mode and the NUE 254b may be in either an RRC_Connected mode or RRC_Idle mode.

In step 402, the base station 256 sends an RRC signalling message on a DL-SCH to the TUE 254a. The RRC signalling message includes a D2D random access preamble. Alternatively, the TUE 254a may already have or know how to generate D2D random access preambles, and the RRC signalling message instead includes an indication of which D2D random access preamble to use. The D2D random access preamble is a contention-free random access preamble that is based on a ZC sequence.

In step 404, the TUE 254a transmits a D2D Group Invite message using D2D communications on a PSDCH. The D2D Group Invite message is the request message inviting at least one other UE to be part of a D2D group with the target UE 254a. The D2D Group Invite message includes the D2D random access preamble.

The D2D Group Invite message is received by the NUE 254b. The NUE 254b decides that it will be part of the D2D group, but to inform the network 252 of this, the NUE 254b needs an uplink resource to transmit a message to the network 252. An uplink resource needs to be requested and granted because in this example the NUE 254b does not have grant-free transmission resources. Therefore, in step 406, the NUE 254b sends a Random Access Request message to the base station 256 on a PRACH. If the NUE 254b is in RRC_Idle mode, then the Random Access Request message sent in step 406 includes a contention-based random access preamble. Otherwise, if the NUE 254b is in an RRC_Connected mode, then the Random Access Request message sent in step 406 includes a contention-free random access preamble that was previously assigned by the network 252.

In step 408, the base station 256 transmits a Random Access Response (RAR) message to the NUE 254b on the DL-SCH. The RAR message sent in step 408 includes:

(1) An index indicating the random access preamble sent in step 406 so that the NUE 254b can confirm the RAR message is indeed for the NUE 254b.

(2) A timing correction value calculated by the base station 256 for compensating for round-trip-time (RTT) to provide synchronization between the NUE 254b and the base station 256.

(3) A scheduling grant indicating an uplink resource granted to the NUE 254b.

If the NUE 254b is in RRC_Idle mode, the RAR message further includes a TC-RNTI, which is the temporary ID assigned to the NUE 254b. The RAR message sent in step 408 is indicated on a PDCCH using a random access radio network temporary identifier (RA-RNTI), which is a reserved identifier that the NUE 254b uses to decode the RAR message.

If the NUE 254b is in RRC_Connected mode, then a TC-RNTI does not have to be included in the RAR message, as the NUE 254b already has a C-RNTI. The C-RNTI is used by the NUE 254b to decode the RAR message.

The RAR message sent in step 408 may be part of a single transmission by the base station 256 that also includes RAR messages for other UEs.

In step 410, the NUE 254b transmits to the base station 256 a D2D Group Ready Report message on the UL-SCH using the uplink resource indicated in the RAR message sent at step 408. The D2D Group Ready Report message is the report message indicating that the NUE 254b will be part of the D2D group with the TUE 254a. The D2D Group Ready Report message includes:

(1) An index indicating the D2D random access preamble that was present in the D2D Group Invite message sent from the TUE 254a at step 404. This informs the network 252 that the NUE 254b is to be part of a D2D group specifically with TUE 254a. In general, there may be multiple TUEs, and the NUE 254b may receive different D2D Group Invite messages from different TUEs. By having the NUE 254b provide an indication of the D2D random access preamble that was present in the D2D Group Invite message received and acted upon by the NUE 254b, the network 252 will know that the NUE 254b is to be part of a D2D group specifically with the TUE associated with that D2D random access preamble, i.e., TUE 254a. Note that the network 252 knows which TUE is associated with which D2D random access preamble, as the D2D random access preamble was assigned by the network 252, e.g., as in message 402 for TUE 254a.

(2) The identifier being used to identify the NUE 254b. The C-RNTI of the NUE 254b is sent if the NUE 254b is in RRC_Connected mode, and otherwise the TC-RNTI or the core network identifier of the NUE 254b is sent if the NUE 254b is in RRC_Idle mode. Including the identifier of the NUE 254b in the D2D Group Ready Repot message allows the network 252 to identify the sender of the D2D Group Ready Report message. This identifier may be included as part of a medium access control (MAC) control element on the UL-SCH.

The NUE 254*b* may provide NUE-specific scrambling of the D2D Group Ready Report message sent in step 410. The scrambling is performed either using the TC-RNTI if the NUE 254*b* is in RRC_Idle mode, or using the C-RNTI if the NUE 254*b* is in RRC_Connected mode.

Based on the information in the D2D Group Ready Report message, the network 252 determines that NUE 254*b* is to be in the D2D group with TUE 254*a*, and so in step 412 the base station 256 sends a D2D Group Confirmation message to both NUE 254*b* and TUE 254*a* on the DL-SCH. The D2D Group Confirmation message is the confirmation message indicating that the NUE 254*b* is in the D2D group with the TUE 254*a*. The D2D Group Confirmation message may be called a D2D RAR message. The D2D Group Confirmation message includes:

(1) An index indicating the D2D random access preamble used by TUE 254*a*, i.e., an index indicating the D2D random access preamble that was present in the D2D Group Invite message sent by the TUE 254*a* at step 404.
(2) The identifier assigned to the TUE 254*a*, such as the C-RNTI of the TUE 254*a*. This is so that the NUE 254*b* knows the identity of the TUE 254*a*.
(3) The identifier assigned to the NUE 254*b*, such as the C-RNTI of the NUE 254*b* if the NUE 254*b* is in RRC_Connected mode or a core network identifier of the NUE 254*b* if the NUE 254*b* is in RRC_Idle mode. This is so that the TUE 254*a* knows the identity of the NUE 254*b*.
(4) A D2D group ID assigned by the network 252 to the D2D group. The D2D group ID may be a G-RNTI.

The D2D Group Confirmation message optionally additionally includes a timing correction value for the TUE 254*a* for synchronizing a D2D communication between the TUE 254*a* and the NUE 254*b*. If the timing correction value is included in the D2D Group Confirmation message, then the timing correction value first must be obtained by the network 252. e.g., as follows: the timing correction value is computed by the NUE 254*b* and forwarded to the network 252 as part of the D2D Group Ready Report message sent in step 410.

The D2D Group Confirmation message sent in step 412 is a random access response message that is scrambled and decoded by the TUE 254*a* and the NUE 254*b* using a D2D specific RA-RNTI. The D2D Group Confirmation message may be part of a single transmission by the base station 256 that also includes D2D Group Confirmation messages for other UEs, such as other TUEs and associated NUEs that are in the coverage area of the base station 256 and that form other D2D groups.

In steps 414 and 416 the NUE 254*b* and the TUE 254*a* respectively send an acknowledgement to the base station 256. The receipt of these acknowledgements confirms for the network 252 that NUE 254*b* is in a D2D group with TUE 254*a* having the assigned D2D group ID, and that NUE 254*b* and TUE 254*a* are in a D2D cooperating mode.

Steps 414 and 416 are optional. If steps 414 and 416 are omitted then the network 252 does not wait for an acknowledgement after sending the D2D Group Confirmation message at step 412. After sending the D2D Group Confirmation message, the network 252 records that NUE 254*b* and TUE 254*a* are in a D2D cooperating mode.

At the end of step 412, or at the end of steps 414 and 416 if included, the network 252 records that the NUE 254*b* and TUE 254*a* are both in RRC_Cooperating mode.

At the end of the method of FIG. 7, the NUE 254*b* and the TUE 254*a* are in an RRC_Cooperating mode. However, the NUE 254*b* and/or the TUE 254*a* may transition out of RRC_Cooperating mode at a later time, either by choice or because they are instructed to by the network 252. As one example, if the battery level of the NUE 254*b* drops below a particular threshold, or the D2D communication link between the NUE 254*b* and the TUE 254*a* breaks or degrades to below a particular threshold, then the NUE 254*b* may inform the network 252 and transition out of RRC_Cooperating mode. As another example, if the network 252 determines that there is no longer a need for assistance with wireless communication between the base station 256 and the TUE 254*a*, then the network 252 may terminate the D2D group by instructing all UEs in the D2D group, including TUE 254*a* and NUE 254*b*, to transition out of RRC_Cooperating mode. As another example, if the network 252 determines that NUE 254*b* is no longer suitable to assist in wireless communication between the base station 256 and the TUE 256*a*, then the network 252 may instruct the NUE 254*b* to transition out of RRC_Cooperating mode, without necessarily terminating the D2D group.

Figure 8:
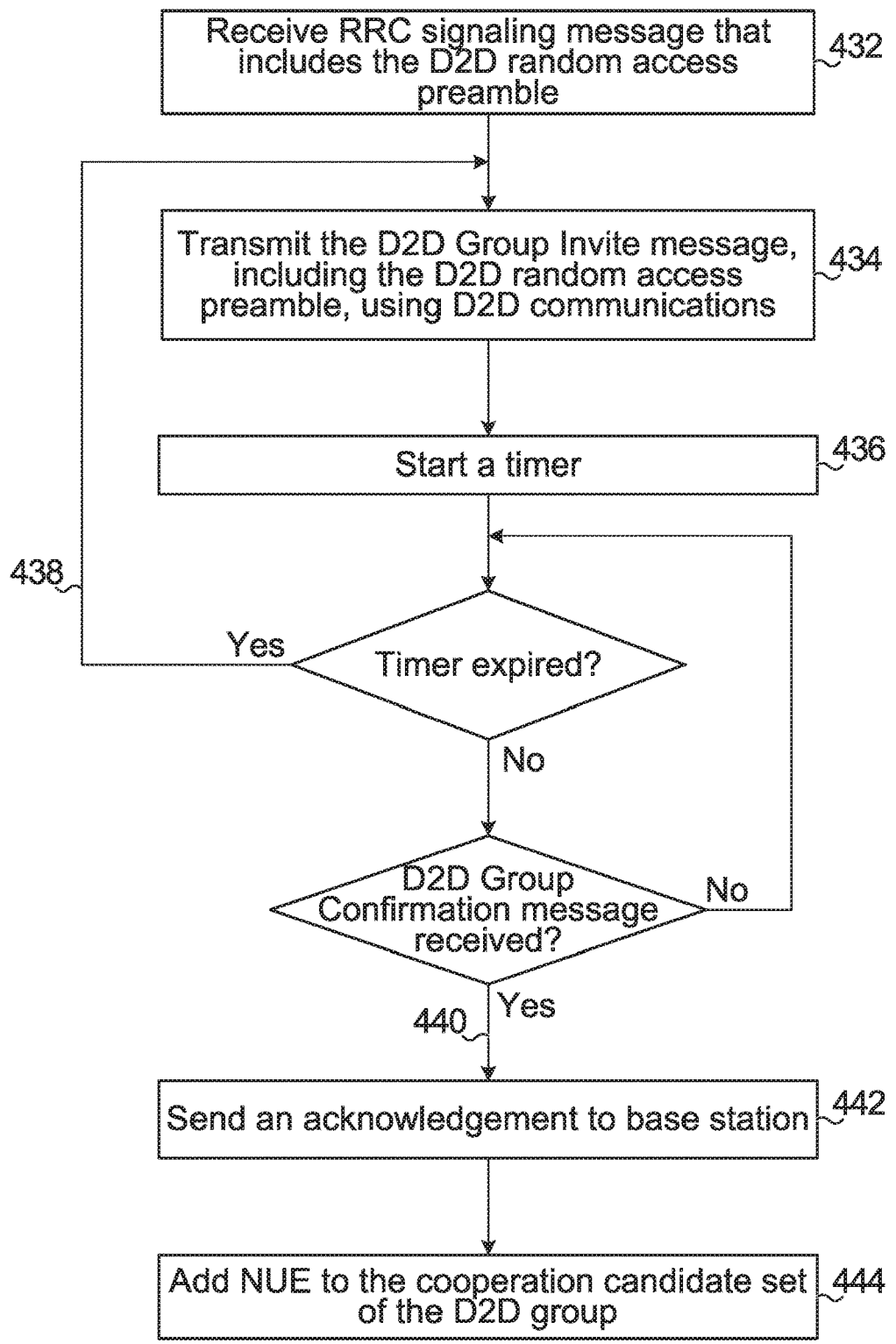
FIG. 8 is a flowchart of operations corresponding to FIG. 7, but from the perspective of the target UE.

FIG. 8 is a flowchart of operations corresponding to FIG. 7, but from the perspective of the TUE 254*a*, and illustrating additional operations performed by the TUE 254*a*. In step 432, the TUE 254*a* receives the RRC signalling message on the DL-SCH that includes or indicates the D2D random access preamble. In step 434, the TUE 254*a* transmits the D2D Group Invite message, including the D2D random access preamble, using D2D communications on the PSDCH. In step 436, the TUE 254*a* starts a timer. The TUE 254*a* now waits for the D2D Group Confirmation message. If the timer expires then the TUE 254*a* concludes that the D2D Group Invite message was not received by and/or not acted upon by another UE, and so step 434 is repeated, as shown at 438. In this example the D2D Group Confirmation message is received, as shown at 440, and so in step 442 the TUE 254*a* sends an acknowledgement to the base station 256, and then at step 444 the TUE 254*a* adds the NUE 254*b* to the cooperation candidate set of the D2D group. The method of FIG. 8 may be repeated to try to further enlarge the D2D group with other neighbour UEs. e.g., if more neighbouring UEs are desired or required to have an effective D2D cooperation group.

Figure 9:
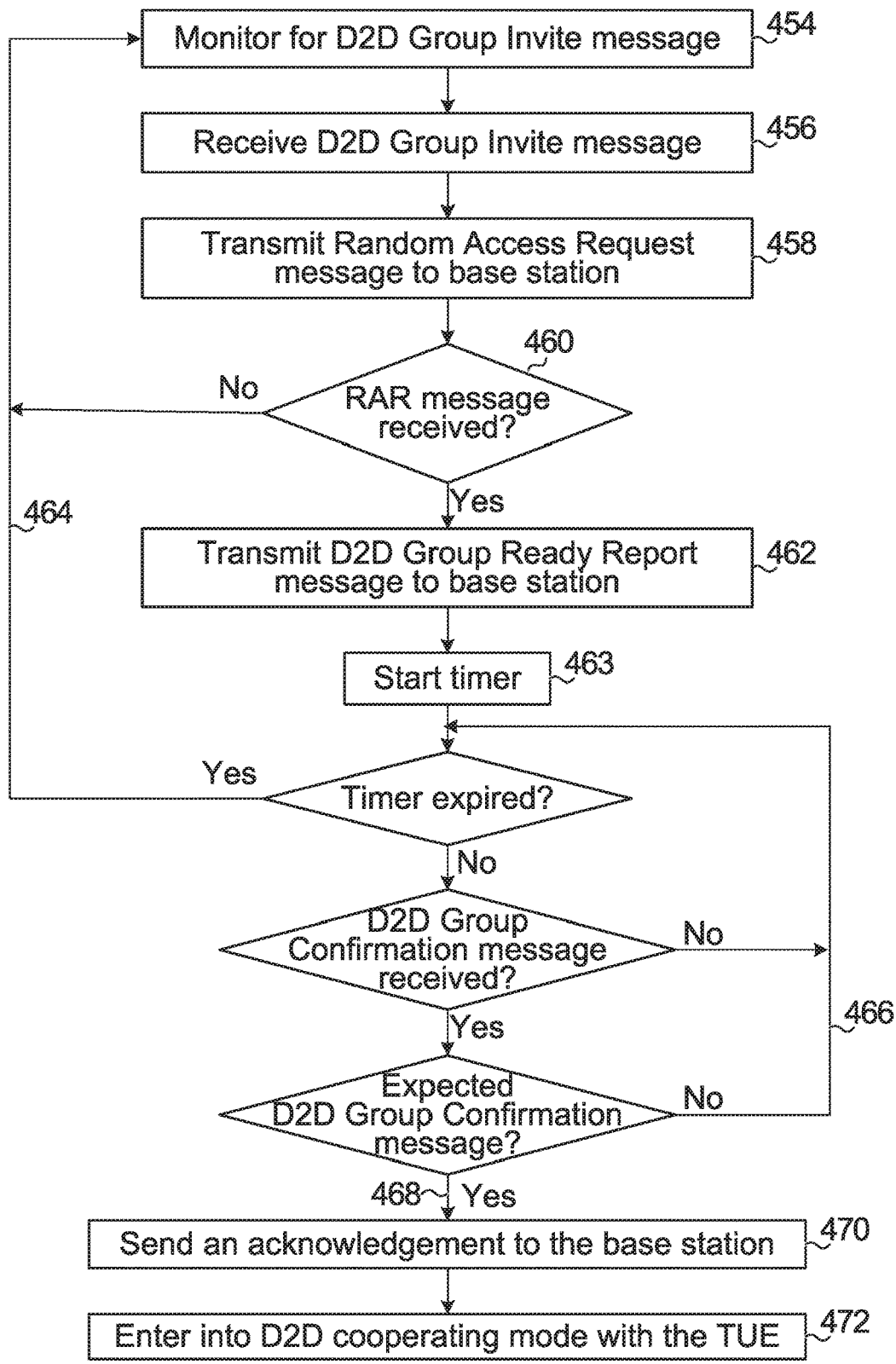
FIG. 9 is a flowchart of operations corresponding to FIG. 7, but from the perspective of the neighbour UE.

FIG. 9 is a flowchart of operations corresponding to FIG. 7, but from the perspective of the NUE 254*b*, and illustrating additional operations performed by the NUE 254*b*. In step 454, the NUE 254*b* monitors the PSDCH for D2D Group Invite messages. In step 456, the D2D Group Invite message sent from TUE 254*a* is received by the NUE 254*b*. In step 458, the NUE 254*b* transmits the Random Access Request message to the base station 256 on the PRACH to request an uplink resource. If the NUE 254*b* is in RRC_Idle mode, then the Random Access Request message includes a contention-based random access preamble. Otherwise, if the NUE 254*b* is in an RRC_Connected mode, then the Random Access Request message includes a contention-free random access preamble. In step 460, the NUE 254*b* waits for the RAR Message from the base station 256 on the DL-SCH. If the RAR message is not received, then the NUE 254*b* proceeds back to step 454. Otherwise, when the RAR message is received, in step 462 the NUE 254*b* transmits the D2D Group Ready Report message to the base station 256 on the UL-SCH. The NUE 254*b* now starts a timer in step 463 and waits for the expected D2D Group Confirmation message from the base station 256. If the timer expires then the NUE 254*b* concludes that a D2D group is not being formed with the NUE 254*b*, and so the NUE 254*b* proceeds back to step 454, as shown at 464. If a D2D Group Confirmation message is received, then the NUE 254*b* confirms that the D2D Group Confirmation message is the expected and correct one by checking that the NUE 254*b* identifier in the D2D Group Confirmation messages matches that of the NUE 254*b*, which was sent to the base station 256 in step 462. If the D2D Group Confirmation message is not the correct one, then the NUE 254*b* continues to monitor for D2D Group Confirmation messages until the timer expires, as shown at 466. In this example, the correct D2D Group Confirmation message is received, as shown at 468, and so in step 470 the NUE 254*b* sends an acknowledgement to the base station 256, and then at step 472 the NUE 254*b* enters into a D2D cooperating mode with the TUE 254*a*, i.e., the NUE 254*b* enters into RRC_Cooperating mode.

Figure 10:
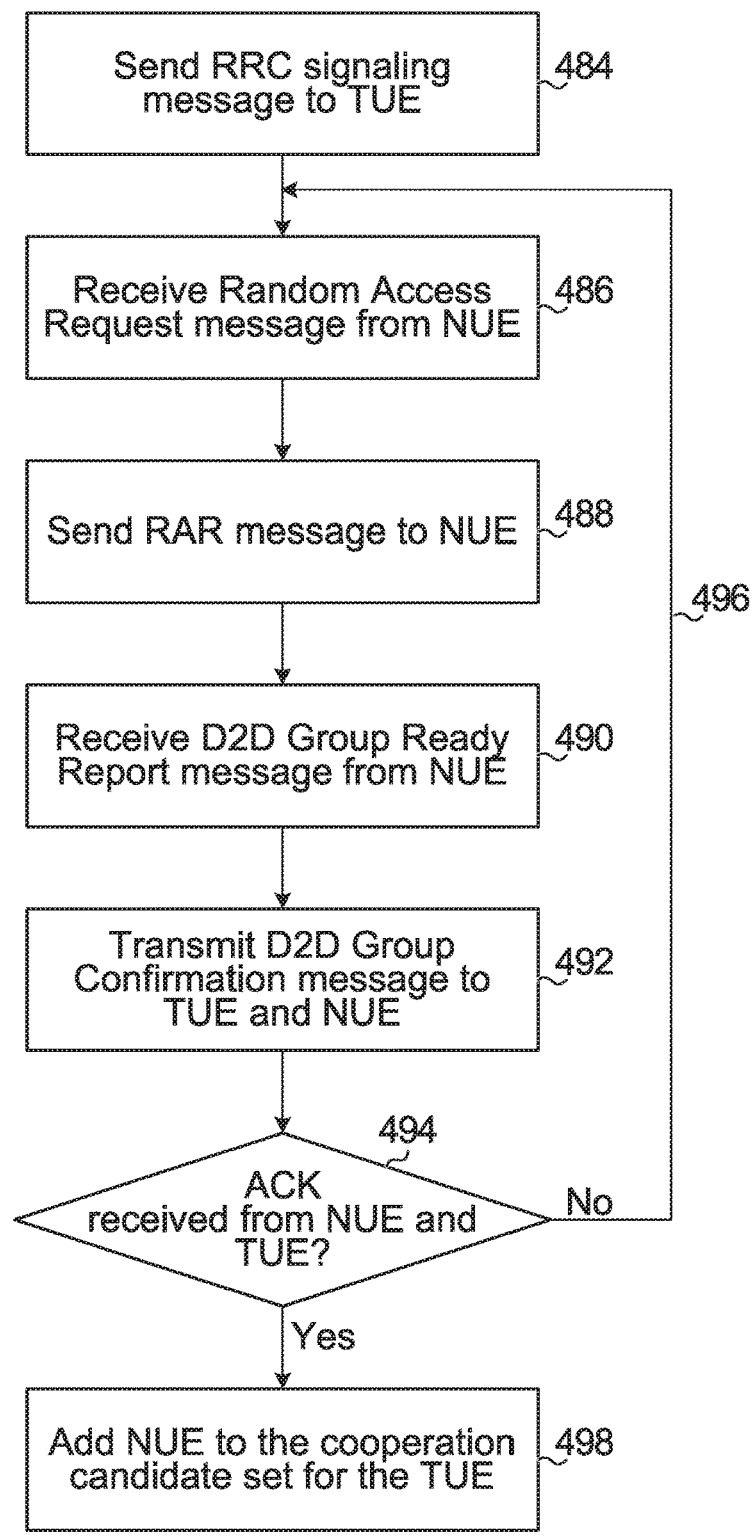
FIG. 10 is a flowchart of operations corresponding to FIG. 7, but from the perspective of the base station.

FIG. 10 is a flowchart of operations corresponding to FIG. 7, but from the perspective of the base station 256, and illustrating additional operations performed by the base station. In step 484, the base station 256 sends the RRC signalling message, including or indicating the D2D random access preamble, on the DL-SCH to the TUE 254*a*. In step 486, the base station 256 receives the Random Access Request message from the NUE 254*b*. The Random Access Request message requests an uplink resource. In step 488, the base station 256 sends the RAR message to the NUE 254*b*. The RAR message grants the uplink resource. In step 490, the base station 256 receives the D2D Group Ready Report message from the NUE 254*b*. In step 492, the base station 256 transmits the D2D Group Confirmation message to both the TUE 254*a* and the NUE 254*b*. In step 494, the base station 256 waits for acknowledgements from both the TUE 254*a* and the NUE 254*b*. If the acknowledgements are not received, then the base station 256 concludes that the NUE 254*b* will not be part of the D2D group, and the base station 256 goes back to waiting for a message, as shown at 496. Otherwise, if the acknowledgements are received, then at step 498 the base station adds the NUE 254*b* to the cooperation candidate set for the TUE 254*a*.

In the embodiments described above in relation to FIGS. 1 to 10, a D2D group is not established based on the physical proximity of UEs, but instead based on radio frequency (RF) proximity, and specifically whether the D2D communication link between a target UE and a neighbour UE is adequate. For example, if the D2D communication link between a target UE and a neighbour UE is not robust enough for the neighbour UE to receive the request message from the target UE, then the neighbour UE and the target UE will not be part of a D2D group. Neighbour discovery therefore leverages RF proximity, which may be more accurate than physical proximity, as just because two UEs are physically close to each other, and just because the network may realize this, it does not mean that there is a good D2D communication link between the two UE devices, e.g., the two UE devices may be on either side of a wall that impedes the D2D communication link. Also, by using RF proximity instead of physical proximity, the UEs may not need to report their physical positions to the network, which may save battery power and reduce uplink traffic. Also, by using RF proximity instead of physical proximity, it may not be necessary to rely upon Global Positioning System (GPS) signals for D2D group formation or operation, which may result in more situations in which a D2D group is formed and operates in an indoor environment.

The embodiments described above in relation to FIGS. 1 to 10 are independent of the spectrum bands over which the UEs and base station communicate. Therefore, D2D groups may be formed and operate even when the UEs support multiband communication and communicate with each other over different frequency bands. For example, with reference to FIG. 1, the D2D group 120 includes UEs 104*a-d*. A particular UE in the D2D group 120, e.g. target UE 104*c*, may communicate with the base station 108*a* over a frequency band that is different from the frequency bands used by UEs 104*a*, 104*b*, and 104*d* to communicate with base station 108*a*. The target UE 104*c* may also directly communicate with each of UEs 104*a*, 104*b*, and 104*d* using D2D communications, but using a different frequency band for each UE. For example, the UE 104*c* may directly communicate with UE 104*a* using D2D communications via a first PSDCH on a first frequency band, and the UE 104*c* may directly communicate with UEs 104*b* and 104*d* using D2D communications via a second PSDCH on a second frequency band. In multiband operation, UE cooperation may exploit carrier aggregation by having the target UE 104*c* communicate with UEs 104*a*. 104*b*, and 104*d* using different frequency bands.

Figure 11:
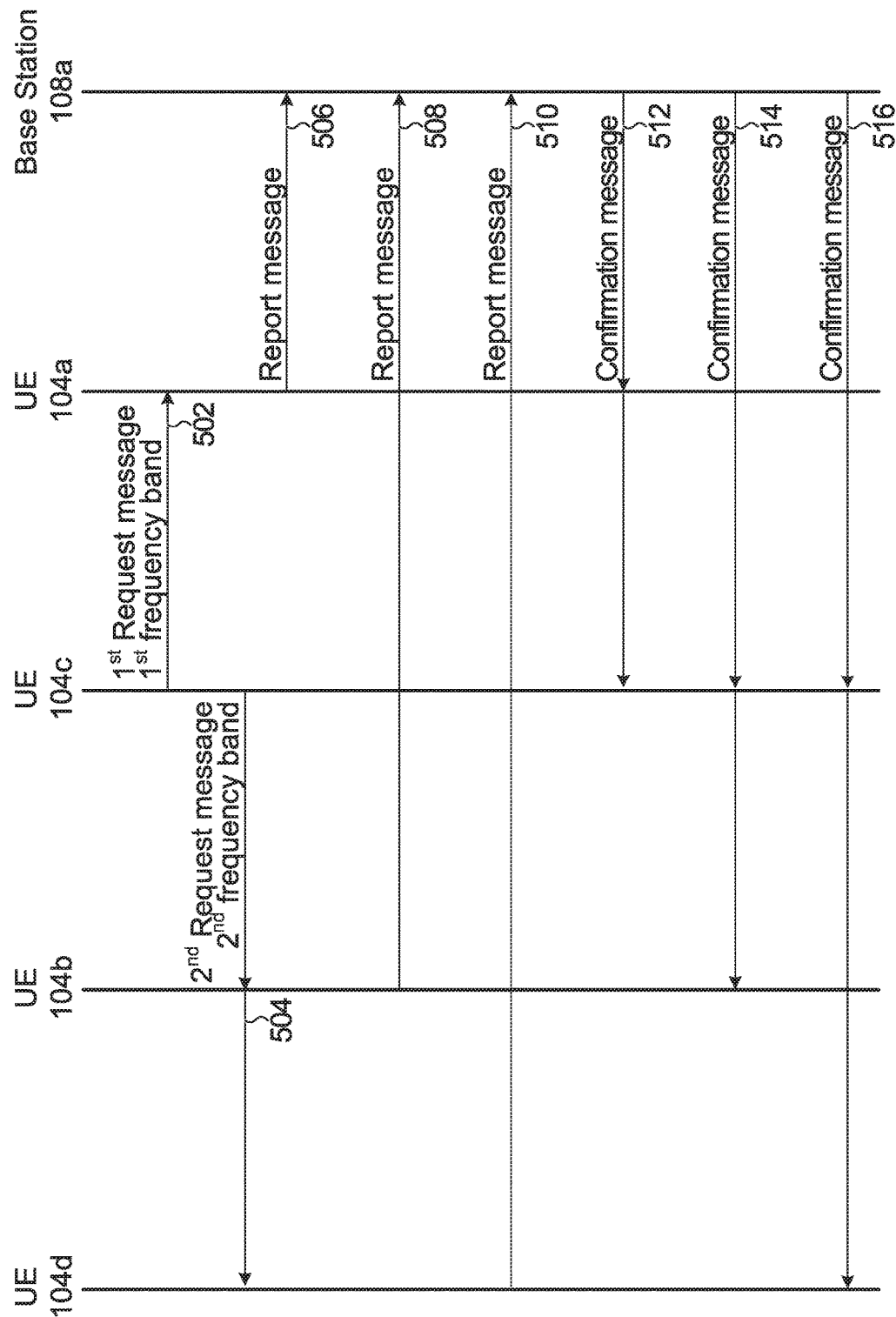
FIG. 11 is a flow chart of operations performed by four UEs and a base station to establish a D2D group according to one embodiment.

FIG. 11 is a flow chart of operations performed by UEs 104*a-d* and base station 108*a* to establish D2D group 120, according to one embodiment, in the situation in which UE 104*c* is a target UE that communicates with UE 104*a* using D2D communications via a first frequency band, and that communicates with UEs 104*b* and 104*d* using D2D communications via a second frequency band. In step 502, UE 104*c* transmits, using D2D communication on the first frequency band, a first request message inviting at least one other UE to be part of a D2D group with UE 104*c*. At step 504. UE 104*c* transmits, using D2D communication on the second frequency band, a second request message inviting at least one other UE to be part of a D2D group with UE 104*c*. Steps 502 and 504 may occur simultaneously. The UE 104*a* receives the first request message, and the UE 104*a* decides that it will be part of a D2D group with UE 104*c*. Therefore, in step 506 the UE 104*a* transmits a report message to the base station 108*a* indicating that the UE 104*a* will be part of the D2D group with the UE 104*c*. The UE 104*b* receives the second request message, and the UE 104*b* decides that it will be part of a D2D group with UE 104*c*. Therefore, in step 508 the UE 104*b* transmits a report message to the base station 108*a* indicating that UE 104*b* will be part of the D2D group with the UE 104*c*. The UE 104*d* also receives the second request message, and the UE 104*d* decides that it will be part of a D2D group with UE 104*c*. Therefore, in step 510 the UE 104*d* transmits a report message to the base station 108*a* indicating that UE 104*d* will be part of the D2D group with UE 104*c*. Steps 506, 508, and 510 may occur simultaneously. The base station 108*a* receives the report message from UE 104*a* and in step 512 transmits to UE 104*a* and UE 104*c* a confirmation message indicating that UE 104*a* is in the D2D group 120 with UE 104*c*. The base station 108*a* receives the report message from UE 104*b* and in step 514 transmits to UE 104*b* and UE 104*c* a confirmation message indicating that UE 104*b* is in the D2D group 120 with UE 104*c*. The base station 108*a* receives the report message from UE 104*d* and in step 516 transmits to UE 104*c* and UE 104*d* a confirmation message indicating that UE 104*d* is in the D2D group 120 with UE 104*c*. Some or all of the messages sent in steps 508 to 516 may be sent over different frequency bands if the UEs 104*a-d* use different frequency bands in their communications with the base station 108*a*. If the base stations 104*a-d* all use the same frequency band to communicate with the base station 108*a*, then the confirmation messages sent in steps 512, 514, and 516 may all be sent by the base station 108*a* in a single signal transmission, e.g., in a DL-SCH.

After D2D group 120 is formed, UE 104*c* directly communicates with UE 104*a* using D2D communications via the first frequency band, and UE 104*c* directly communicate with UEs 104*b* and 104*d* using D2D communications via the second frequency band.

The variations and possible configurations of the request, report, and confirmation messages that were described above in relation to FIG. 3 also apply to FIG. 11.

In multiband operation, some of the frequency bands may be licensed frequency bands, and other of the frequency bands may be unlicensed frequency bands. The network 106 may broadcast signalling indicating when request messages are to be sent on each frequency band and/or when UEs 104*a*-*d* are to listen for a request message on each frequency band and/or what frequency resources are to be used to send/receive request messages on each frequency band. For example, the network 106 may indicate what resources are to be used by the UEs 104*a*-*d* for sidelink discovery purposes on a PSDCH.

Figure 12:
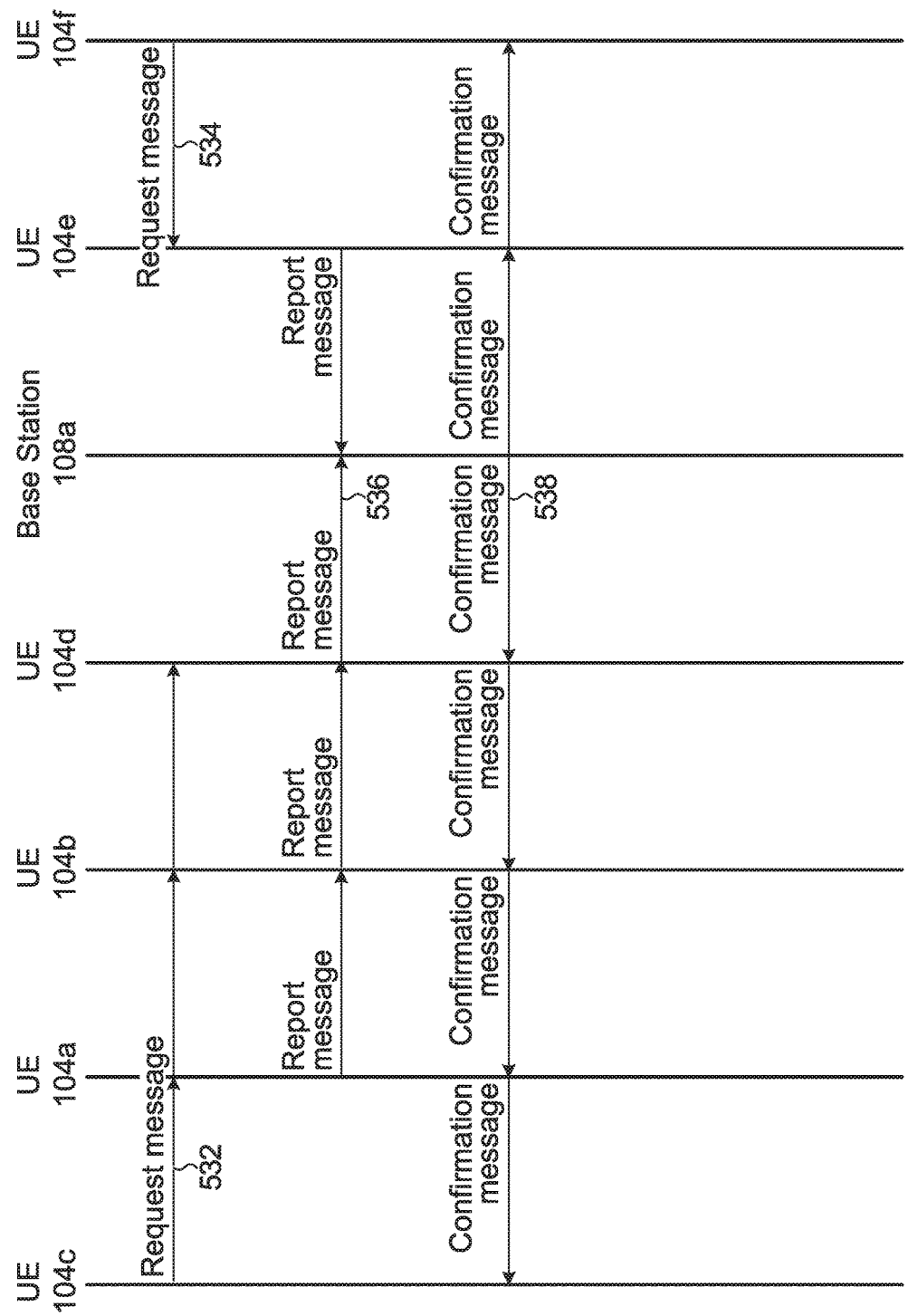
FIG. 12 is a flow chart of operations performed by UEs and a base station to establish two D2D groups in accordance with one embodiment.

A single transmission from a UE or a base station may serve multiple UEs on the same frequency band. For example, FIG. 12 is a flow chart of operations performed by UEs 104*a*-*f* and base station 108*a* to establish D2D groups 120 and 122, in accordance with one embodiment, in the situation in which UEs 104*c* and 104*f* are each a target UE, and in the situation in which all communications occur on the same frequency band. In step 532, UE 104*c* transmits, using D2D communication, a request message inviting at least one other UE to be part of D2D group 120 with UE 104*c*. In step 534, UE 104*f* transmits, using D2D communication, a request message inviting at least one other UE to be part of D2D group 122 with UE 104*f*. Steps 532 and 534 may occur simultaneously. Each one of the UEs 104*a*, 104*b*, and 104*d* receives the request message from UE 104*c* and decides that it will join the D2D group 120 with UE 104*c*. The UE 104*e* receives the request message from UE 104*f*, and the UE 104*e* decides that it will join the D2D group 122 with UE 104*f*. Each of UEs 104*a*. 104*b*, and 104*d* send their own respective report message to the base station 108*a* indicating that they will be part of the D2D group 120 with UE 104*c*, and UE 104*e* also sends its own report message to the base station 108*a* indicating that UE 104*e* will be part of D2D group 122 with UE 104*f*. In this embodiment, all report messages sent from UEs 104*a*, 104*b*, 104*d*, and 104*e* are transmitted in the same uplink transmission on a respective uplink resource granted by the base station 108, e.g., via an UL-SCH. This is shown at step 536. The base station 108*a* sends a confirmation message to each of UEs 104*a*-*d* indicating that they are in D2D group 120, and the base station 108*a* also sends a confirmation to each of UEs 104*e*-*f* indicating that they are in D2D group 122. In this embodiment, all confirmation messages sent by the base station 108*a* are transmitted in the same downlink transmission, as shown at step 538. In this way, the base station 108*a* may receive multiple report messages from different UEs in a single uplink signal transmission and may send multiple confirmation messages for different UEs in a single downlink signal transmission. Optionally, the base station may indicate to each of UEs 104*a*, 104*b*, and 104*d* what other UEs are in D2D group 120.

A possible benefit of some embodiments includes centralized network control to coordinate the D2D discovery and D2D group formation process and thereby possibly result in more efficient utilization of resources and less overhead. For example, the network may decide when a D2D group is to be formed and allocate resources to the appropriate UEs, as needed, for sending and receiving D2D group invite messages. This may be more efficient compared to having UEs continually send and monitor for D2D group invite messages at all times, which would affect battery consumption and may pose security risks due to possibly having a fully open control channel. Another possible benefit of having the network control the resources for the D2D discovery process is that collision probability may be reduced, as the network may control when D2D group invite messages are sent. Another possible benefit of network control is that the network may control which UEs in a D2D group are to form a cooperation active set to assist a target UE. The network may dynamically adjust the cooperation active set according to prevailing channel and interference conditions. Security risks may also be mitigated in some embodiments because, in such embodiments, only UEs assigned the proper D2D Group ID by the network have access to the information broadcast by the network for the target UE. Therefore, the number of UEs who have access to the target UE's information is limited only to the D2D group.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-tran-

The invention claimed is:

1. A method performed by a target user equipment (UE), the method comprising:
receiving a preamble from a base station;
transmitting, using device-to-device (D2D) communication, a request message to a neighbour UE, the request message including the preamble, and the request message inviting at least one other UE to be part of a D2D group with the target UE; and
receiving a confirmation message from the base station, the confirmation message indicating that the neighbour UE is in the D2D group with the target UE.

2. The method of claim 1, wherein the confirmation message includes an indication of the preamble.

3. The method of claim 1, wherein receiving the preamble comprises receiving the preamble in a radio resource control (RRC) signalling message.

4. The method of claim 1, wherein the preamble is assigned by a network.

5. The method of claim 4, wherein receiving the preamble comprises receiving an indication of which preamble is assigned by the network.

6. The method of claim 1, wherein the preamble is a random access preamble.

7. The method of claim 6, wherein the random access preamble is a contention-free D2D random access preamble.

8. The method of claim 7, wherein the contention-free D2D random access preamble is based on a Zadoff-Chu (ZC) sequence.

9. The method of claim 1, wherein the confirmation message is in response to a report message to the base station indicating that the neighbour UE will be part of the D2D group with the target UE.

10. The method of claim 1, further comprising:
after receiving the confirmation message, using D2D communication to communicate with the neighbour UE to be assisted with wireless communication between the target UE and the base station.

11. The method of claim 1, wherein the confirmation message includes a D2D group ID assigned by a network to the D2D group.

12. A target user equipment (UE) comprising:
at least one antenna;
a device-to-device (D2D) communication module configured to instruct the target UE to:
receive a preamble from a base station;
transmit, using D2D communication, a request message to a neighbour UE, the request message including the preamble, and the request message inviting at least one other UE to be part of a D2D group with the target UE; and
receive a confirmation message from the base station, the confirmation message indicating that the neighbour UE is in the D2D group with the target UE.

13. The target UE of claim 12, wherein the confirmation message includes an indication of the preamble.

14. The target UE of claim 12, wherein the target UE is to receive the preamble in a radio resource control (RRC) signalling message.

15. The target UE of claim 12, wherein the preamble is assigned by a network.

16. The target UE of claim 15, wherein the target UE is to receive the preamble by receiving an indication of which preamble is assigned by the network.

17. The target UE of claim 12, wherein the preamble is a contention-free D2D random access preamble.

18. The target UE of claim 12, wherein the confirmation message is in response to a report message to the base station indicating that the neighbour UE will be part of the D2D group with the target UE.

19. The target UE of claim 12, wherein the D2D communication module is further configured to instruct the target UE to:
after receiving the confirmation message, use D2D communication to communicate with the neighbour UE to be assisted with wireless communication between the target UE and the base station.

20. The target UE of claim 12, wherein the confirmation message includes a D2D group ID assigned by a network to the D2D group.

* * * * *